United States Patent

[11] 3,588,231

| [72] | Inventor | George E. Platzer, Jr.<br>Southfield, Mich. |
|---|---|---|
| [21] | Appl. No. | 866,620 |
| [22] | Filed | Oct. 15, 1969 |
| [45] | Patented | June 28, 1971 |
| [73] | Assignee | Chrysler Corporation<br>Highland Park, Mich. |

[54] DAY-NIGHT REAR MIRROR REMOTE ACTUATOR
11 Claims, 5 Drawing Figs.

[52] U.S. Cl. ............................................ 350/279, 74/501
[51] Int. Cl. ............................................ G02b 5/08, G02b 7/18
[50] Field of Search ............................ 350/278, 283; 74/501, 501 (M)

[56] References Cited
UNITED STATES PATENTS
3,198,070  8/1965  Platzer, Jr., et al. ......... 350/278X
3,407,684  10/1968  Van Noord .................. 74/501

*Primary Examiner*—John K. Corbin
*Attorney*—Harness, Talburtt & Baldwin

ABSTRACT: An actuator for remotely operating a day-night rear view mirror wherein a plurality of peripherally spaced lever arms are mounted for rotation to engage a mirror actuating cable and shiftably displace it.

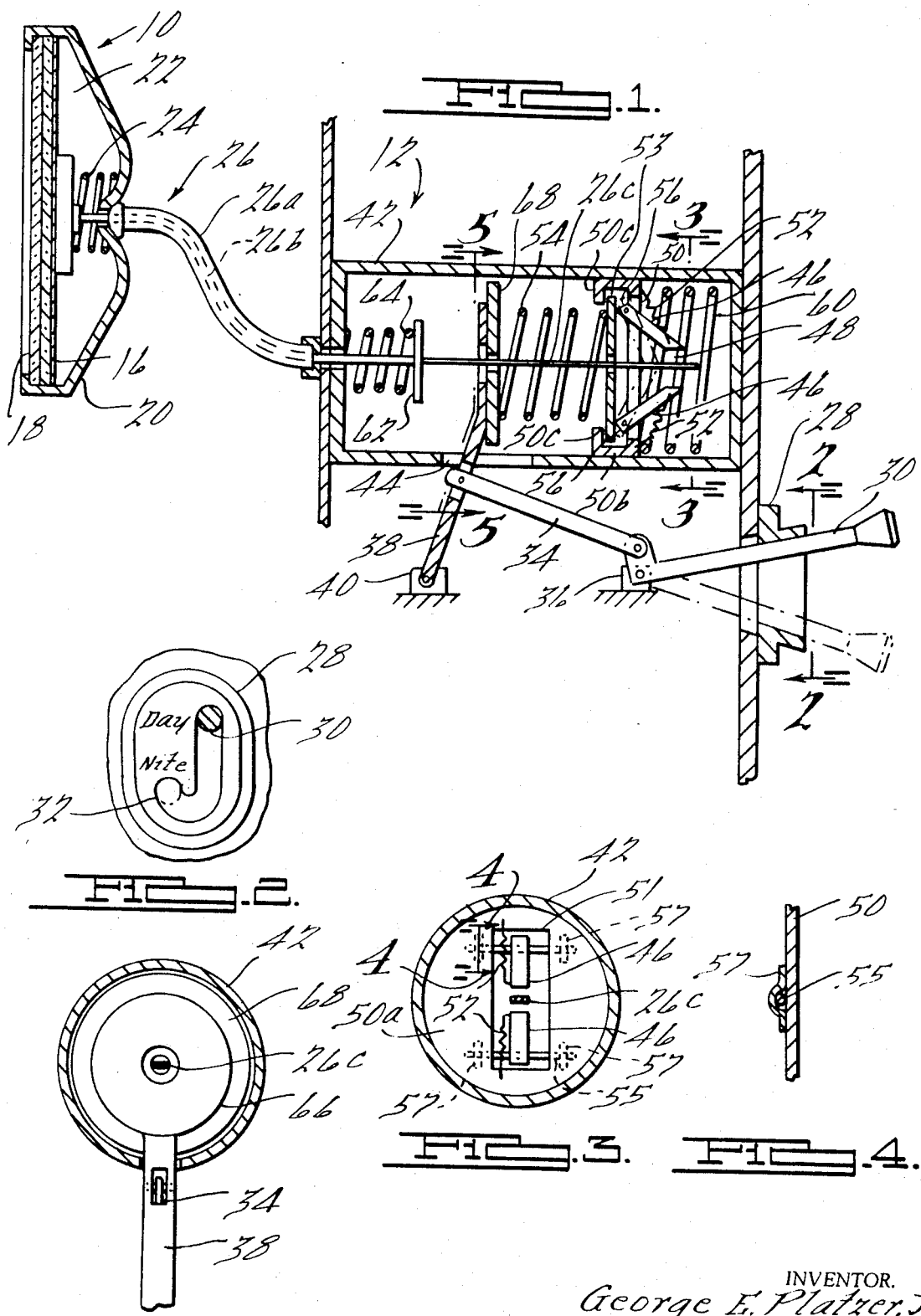

DAY-NIGHT REAR MIRROR REMOTE ACTUATOR

BACKGROUND OF THE INVENTION

This invention relates generally to two-position or day-night rear view mirrors and to a mechanism for remotely actuating such mirrors. It especially relates to a fluid mirror of the kind described in U.S. Pat. No. 3,198,070 which issued to G. E. Platzer, Jr. and L. P. Gau on Aug. 3, 1965 and U.S. Pat. No. 3,233,515 which issued to G. E. Platzer, Jr., D. M. Teague and H. G. Ross, Jr. on Feb. 8, 1966 wherein a rear view mirror is described which has a transparent window and a mirror movable relative to the window. When the mirror is against the window normal light reflections occur. When the mirror is moved away from the window a dark fluid moves therebetween to provide an opaque screen which inhibits light reflections from the mirror but allows them from the window. As a result less light is reflected when the mirror is away from the window.

Rear view mirrors of the types contemplated herein are most conveniently operated by a remote actuator particularly in the case of an outside mirror. Connection between adjustable mirrors and a remote actuating mechanism is usually achieved by means of a length of cable. However, the remote mounting of an automobile rear view mirror with respect to the actuation mechanism usually requires many bends in the interconnecting cable. For this reason, a wire enclosed in a sheath is conventionally used; the sheath providing a channel in which the wire may slip. An alternative is the use of a pulley arrangement to allow for the movement of the connecting cable which is obviously impractical.

In selecting sheathed wire for mirrors of the types contemplated herein, a Bowden cable of the type defined in the "Dictionary of Mechanical Engineering," J. L. Mayler, Hart Publishing Company, New York, 1967 is preferably used. In a Bowden cable the inner wire may be either a braided flexible wire or a stiffer solid wire. The braided wire is preferred since it will undergo more bending, twisting, changes of direction and will turn tighter corners than the more typical stiff inner wire. However, braided wire tends to stretch. Consequently, over a period of time its length will change. In the case of the fluid mirrors preferably contemplated herein the travel of the mirror from the day to the night position is usually about one-eighth inch. This travel is extremely short and any stretching of the actuating cable will cause a loss in the travel distance. Consequently, upon actuation the mirror will not be moved the full distance required to reach the night position. Such a loss is unacceptable over such a small distance of travel.

SUMMARY OF THE INVENTION

This invention provides a remote actuator mechanism which possesses a self-adjusting feature to allow for cable stretching. In accomplishing this end, the cable is allowed to float free within the actuator until selectively engaged thereby. Since the position of the mirror assembly and the actuator mechanism are fixed relative to each other, when the cable undergoes any change in longitudinal dimension it repositions itself relative to the actuator. As a result, the cable is always adjusted to the correct length for obtaining full travel of the mirror between the two positions. Engagement of the cable is accomplished by providing a plurality of spaced lever arms which define a space for receiving the cable. The arms are inwardly rotatable to engage the cable and are arranged for translational movement so that they are longitudinally shiftable with respect to the cable after engagement to cause cable displacement and movement of the mirror.

DESCRIPTION OF THE DRAWING

FIG. 1 is a schematic in cross section showing a day-night mirror and the remote actuator assembly therefor.

FIG. 2 is a front elevation view of a lever arm positioning arrangement used in the embodiment shown in FIG. 1 taken along lines 3–3 thereof.

FIG. 3 is a view taken on lines 3–3 of FIG. 1.

FIG. 4 is a view taken on lines 4–4 of FIG. 3.

FIG. 5 is a view taken on lines 5–5 of FIG. 1.

DESCRIPTION OF THE PREFERRED EMBODIMENT

A day-night rear view mirror and remote actuator are shown in FIG. 1, the mirror assembly being generally indicated at 10 and the remote actuator assembly being generally indicated at 12. Mirror assembly 10 includes a movable mirror plate 16, a transparent front window 18, a housing 20 and a light attenuating fluid 22 within the housing. This mirror is of the type described in the previously mentioned patents and is biased against window 18 by means of spring 24 to a normal or day position. Mirror 16 may be moved or retracted from window 18 to a night position by means of an elongated actuating member generally indicated at 26 which is preferably Bowden cable consisting of a sheath 26a and a braided inner cable 26b. The end of actuating member 26 remote relative to mirror assembly 10 is received by actuator assembly 12 which may be mounted within an automobile door as schematically indicated. The actuator assembly includes a frame member 28 through which a manual operable lever 30 extends so as to be accessible to an operator within the car. As shown in FIG. 2 frame member 28 includes a suitable means, such as a detent arrangement which may be of the type indicated at 32 whereby lever 30 may be releasably held in either of two positions corresponding to the day and night positions of movable mirror 16.

Lever 30 is connected to one end of a first actuation member 34 and also to a fixed pivot 36. The other end of the actuation member 34 is connected intermediate the ends of a second actuation member 38. One end of the second actuation member 38 is also connected to a fixed pivot 40 while the other end extends into housing 42 through an elongated slot 44. This lever arrangement provides substantial translational displacement or shifting of the interior end portion of lever 38 when lever 30 is moved between its two positions.

A plurality of inwardly pointing lever arms 46, only two are shown in this embodiment, are spaced generally peripherally so that the inward ends thereof define an aperture or space 48 for receiving the end of the actuating cable which may preferably terminate in a flat tongue 26c adopted for gripping by the lever arm. Lever arms 46 are rotatably mounted on the planar body portion 50a of a movable support 50 so as to be inwardly rotatable to a position of engagement with the cable as shown in phantom in FIG. 1 and are preferably disposed so that their longitudinal axes point generally obliquely in the direction in which the cable is to be shifted. Support 50 is mounted for reciprocating movement in housing 42 and may include a sidewall 50b and inturned lip 50c. Preferably, resilient means such as a biasing spring 52 may also be included with each arm to maintain them in a normal unactuated position away from the cable.

FIG. 3 shows the rotatable mounting arrangement of lever arms 46 on support 50 in more detail. As can be seen from this FIG., support 50 preferably includes an aperture 51 within and through which the lever arms are peripherally positioned. The rotating mounts for the arms consist of small pivots 55 which are held against one side of body portion 50a by means of brackets 57 as shown in detail in FIG. 4.

Referring again to FIG. 1, shiftable member 53 is disposed intermediate body portion 50a, the outwardly pointing lever arm ends 56 and a helical spring 54. Shiftable member 53 is positioned transversely with respect to the outward ends of the lever arms to bear against them when member 53 is shifted toward body portion 50a of support 50 by movement and compression of helical spring 54. Preferably, shiftable member 53 is disposed within the sidewall 50b of support 50 as shown and maintained proximate the planar body portion 50a by means of inturned lip 50c which serves as an abutment for the shiftable member. The other end of spring 54 is disposed adjacent the interior end portion of actuating member 38.

FIG. 5, shows a preferred structure for the inner end portion of actuating member 38 which facilitates transfer of actuating forces from lever 30 to helical spring 54. This is accomplished by broadening the end of actuation member 38. For example, it may be broadened to an annular shape as shown at 66. Furthermore, a plate 68 may also be included if desired for bearing against spring 54.

As can be seen from the drawing, cable 26 is preferably concentrically received for reciprocating movement within housing 42 and the actuator elements are preferably aligned therein to concentrically receive the cable. When the actuator is in the condition shown, the cable is essentially free.

When lever 30 is moved to the night position, as shown in phantom, actuation member 38 rotates on its fixed pivot 40 compressing spring 54 and urging shiftable member 53 against the outwardly pointing ends of the lever arms causing them to rotate inwardly and engage the flat end portion 26c of cable 26. The tension stored in spring 54 by the translational movement of lever 38 causes a continuance of the urging forces, which have effected engagement of the cable, and translationally displaces or shifts support 50 longitudinally with respect to the cable thereby displacing or shifting both the lever arms and the engaged cable to cause movement of mirror 16 away from window 18 to the retracted night position.

The elements of the actuating assembly are maintained in a centralized rest position in the housing by means of positioning spring 60. A guard disc 62 is attached to cable 26 and is biased inwardly of housing 42 by spring 64 to insure that the cable remains with the housing. Upon return of lever 30 to the day position, positioning spring 60 repositions support 50, helical spring 54 and the inner end of the second actuator member 38 within the housing to its desired rest position. The lever arms release cable 26 and spring 24 returns mirror 16 to its normal position.

Various changes and modifications may be made to the construction described herein without departing from the spirit and intent of the invention.

I claim:

1. a remote actuator for a rear view mirror having a day and a night viewing position wherein the shifting of an elongate actuating member connected to the mirror displaces it between the two positions, the actuator comprising:
   A. a plurality of generally inwardly pointing lever arms, the inward ends of which define a space for receiving a portion of an actuating member, and
   B. means for inwardly rotating and translating said arms comprising:
      1. a shiftable member transversely disposed of said arms and adapted to rotate said arms inwardly to an engagement position and translationally displace them in response to shifting movement of said member, and
      2. means for shifting said member and holding same in a shifted position comprising:
         a. an element operatively contacting said member and adapted for shifting it, and
         b. means for releasably holding said element in said shifted position.

2. The actuator of claim 1 in which the axes of said arms generally point obliquely in the direction in which they are to be translationally displaced.

3. The actuator of claim 1 including:
   C. a movable support for said arms, said support being disposed transversely of said arms, and
   D. attachment means rotatably mounting said arms on said support for inward rotation transversely of their longitudinal axes.

4. The actuator of claim 3 wherein:
   A. said movable support comprises a member including a transverse planar portion with a generally central aperture,
   B. said attachment means includes pivot means mounting each of said arms in spaced relationship within the aperture and at the periphery thereof transversely of said planar body portion, said means being located intermediate the ends of said arms so as to dispose the inwardly pointing ends of said arms to one side of said planar portion of said body and to dispose the opposite outwardly pointing ends of said arms on the opposite side of said planar portion, and
   C. said shiftable member includes a planar transverse portion with a generally central aperture, said member being disposed adjacent said support and substantially parallel to said planar portion thereof.

5. The actuator of claim 4 including resilient means biasing the inward ends of said arms to a fixed normal attitude.

6. The actuator of claim 4 including abutment means for maintaining said shiftable member proximate said arms and support.

7. The actuator of claim 6 wherein:
   A. said planar body portion of said support includes a peripheral sidewall on the side to which said shiftable member is adjacent,
   B. said shiftable member is disposed within the periphery of said sidewall, and
   C. said abutment means comprises an inwardly turned lip portion carried by said sidewall of said support.

8. The actuator of claim 4 wherein:
   said means for shifting said shiftable member includes a lever actuated spring means disposed against the side of said shiftable member opposite said support for resiliently urging said shiftable member against said arms and said support.

9. The actuator of claim 8 wherein said spring means is a helical spring.

10. The actuator of claim 8 including:
    an elongate housing slidably receiving said movable support, said shiftable member and said helical spring in aligned relationship for reciprocating movement therein, said actuator being adapted to receive a mirror actuating member concentrically therein.

11. A remote controlled rear view mirror apparatus comprising:
    A. a mirror assembly including:
       1. a viewing window
       2. a mirror, and
       3. means mounting said mirror for movement between a position in juxtaposition with said window and a position spaced therefrom;
    B. a Bowden type cable having one end connected to said mirror for moving it between the two positions in response to longitudinal shifting thereof, and
    C. an actuator assembly receiving the other end of said cable for selectively shifting same and including:
       1. a plurality of inwardly pointing lever arms the inward ends thereof normally defining an aperture for receiving said cable, and
       2. means for inwardly rotating said arms and shifting them longitudinally with respect to said cable, said means comprising
          a. a shiftable member transversely disposed of said arms and adapted to rotate said arms inwardly to an engagement position with said cable and to shift said arms and said cable longitudinally with respect to said cable, in response to shifting movement of said member, and
          b. means for shifting said member and holding same in a shifted position comprising
             1. an element operatively contacting said member and adapted for shifting it, and
             2. means for releasably holding said element in said shifted position, and
    D. means resiliently biasing said mirror to said juxtaposed position and said arms to a normal position in which they define the cable receiving space.